(12) United States Patent
Laor et al.

(10) Patent No.: US 7,095,917 B2
(45) Date of Patent: *Aug. 22, 2006

(54) OPTICAL SWITCHING APPARATUS

(76) Inventors: Herzel Laor, 2050 Hillsdale Cir., Boulder, CO (US) 80303; David A. Krozier, 123 Westfield Dr., North Altleboro, MA (US) 02760; Leo A. Plouffe, 1290 Smith St., Dighton, MA (US) 02764

( * ) Notice: Subject to any disclaimer, the term of this patent is extended or adjusted under 35 U.S.C. 154(b) by 104 days.

This patent is subject to a terminal disclaimer.

(21) Appl. No.: 10/197,636

(22) Filed: Jul. 17, 2002

(65) Prior Publication Data

US 2006/0115208 A1 Jun. 1, 2006

Related U.S. Application Data

(63) Continuation of application No. 09/310,285, filed on May 12, 1999, now Pat. No. 6,430,332.
(60) Provisional application No. 60/088,239, filed on Jun. 5, 1998.

(51) Int. Cl.
*G02B 6/26* (2006.01)
(52) U.S. Cl. .............................. 385/18; 385/47; 385/52
(58) Field of Classification Search .................. 385/18, 385/17, 33, 47, 50, 52, 16, 19, 22; 359/117, 359/128
See application file for complete search history.

(56) References Cited

U.S. PATENT DOCUMENTS

| 4,365,863 | A | * | 12/1982 | Broussaud | 385/17 |
| 5,872,880 | A | * | 2/1999 | Maynard | 385/88 |
| 6,097,859 | A | * | 8/2000 | Solgaard et al. | 385/17 |
| 6,430,332 | B1 | * | 8/2002 | Laor et al. | 385/18 |

FOREIGN PATENT DOCUMENTS

JP 5107485 A * 4/1993

* cited by examiner

*Primary Examiner*—Sung Pak
(74) *Attorney, Agent, or Firm*—Marsh Fischmann & Breyfogle LLP

(57) ABSTRACT

An optical matrix switch station (1) is shown mounting a plurality of optical switch units (15, 17), each of which includes a mirror (29), moveable in two axes, for purpose of switching light beams from one optical fiber to another. A mirror assembly (41) is formed from a single body of silicon and comprises a frame portion (43), gimbals (45), mirror portion (47), and related hinges (55). Magnets (53, 54) and air coils (89) are utilized to position the central mirror surface (29) to a selected orientation. The moveable mirror and associated magnets along with control LED's (71) are hermetically packaged in a header (81) and mounted with the air coils on mounting bracket (85) to form a micromirror assembly package (99) mounted in each optical switch unit.

74 Claims, 16 Drawing Sheets

OPTICAL SWITCHING APPARATUS

RELATED APPLICATIONS

This application is a continuation of U.S. patent application Ser. No. 09/310,285 filed on May 12, 1999, now issued as U.S. Pat. No. 6,430,332, which claims the benefit of U.S. Provisional Application No. 60/088,239 filed Jun. 5, 1998.

FIELD OF INVENTION

This invention relates generally to optical switching and more particularly to non-electrical switching of laser communication signals.

BACKGROUND OF THE INVENTION

In recent years optical fibers have come into wide spread use in a wide variety of applications in which optical signals are transmitted along such fibers and are switched from one fiber to another by means of an optical switch. Conventional optical switches generally include fiber positioning means, alignment signal emitter means and interconnected computer control means. A fiber positioning means is provided near the end of each fiber to selectively point the end of a given fiber in one fiber group toward the end of a given fiber in another fiber group for switched optical transmission therebetween. An alignment signal emitter means is provided near an end of and in predetermined spaced relationship to the end of each fiber to emit an alignment signal for receipt and use in controlling the fiber positioning means when aligning the ends of selected fibers in the fiber groups for switched optical transmission therebetween, for example as shown in U.S. Pat. Nos. 4,512,036 and 5,177.348. This approach requires considerable complexity and duplication of alignment means for each alignable fiber. It would be very desirable to reduce this complexity and duplication and to increase speed of switching, reliability, as well as to reduce cost in implementation.

SUMMARY OF THE INVENTION

An object of the present invention is to provide an optical switch that overcomes the limitations of the above noted prior art. Another object of the inventions is to provide an optical switching unit which is relatively low in cost, has high speed and is reliable in operation. Briefly in accordance of the invention, an improved optical light transmission switch employs a microelectromechanical (hereinafter MEM) movable mirror assembly with associated electromagnet coils mounted in a package and preferably including control LED's with both drive and LED signals being supplied through a wiring harness. The following described preferred embodiments relate to a hermetic package using inorganic materials in order to provide extended life, however, units can be made which include organic materials for other shorter life applications.

The package comprises an LED lead frame of suitable material such as ceramic, which mounts LED's used by the control system to aim the movable mirror as well as circuitry to electrically connect the LED's to their package terminations. As will be discussed below, the LED's provide signals for controlling the position of the movable mirror so that any two mirrors in an array can be positioned to reflect a light beam precisely at each other so that the light beam is focused entirely on the reflective surface of the mirrors and in that way no energy of the beam is lost in the reflection process of the switched connection. The LED's are die and wire bonded to the lead frame using conventional techniques. The LED's are located so that lines drawn through diagnonal pairs would pass through a selected location on the lead frame which is referenced the movable mirror. A mirror assembly, described below, is attached to the lead frame so that the center of the mirror portion coincides with the selected location on the lead frame in order to accurately locate the mirror relative to one another for proper control of mirror movement. The mirror assembly and lead frame are mounted in a header of suitable material, such as ceramic which, along with driving means and a wiring harness, are in turn mounted on a bracket. The package is received in a housing in which an optical fiber is received and in which another mirror is disposed in alignment with the fiber for reflecting an optical signal from the fiber to the movable mirror.

MEM micromirrors are presently used to build digital micromirror display (DMD) devices where the mirrors rotate about a single axis by an electrostatic drive. The mirror of the present invention provides two axes of motion and is preferably driven magnetically. The micromirror is preferably made from a single piece of crystal material such as silicon and has three portions connected by two sets of hinges. An inner portion forms the mirror. One of the hinge pairs, one hinge on each of two opposite sides of the mirror portion, ties the mirror portion and the middle gimbals portion, which surrounds the mirror portion. This allows the mirror portion to rotate about the gimbals portion, providing the first axis of rotation. The second set of hinges-ties the gimbals portion and the frame portion, one hinge on each of two opposite sides on a line disposed, 90 degrees relative to a line drawn through the first set of hinges. This allows the gimbals portion, which carries the mirror, to rotate about the frame portion, providing a second axis of rotation.

Two pair magnets, one for each axis of rotation, are used to move the mirror portion and are mounted on one face of the single piece to form a mirror assembly. The first pair of magnets are attached by suitable means to the mirror portion of the mirror assembly, one on each of two opposite sides of a line, 90 degrees relative to a line through the mirror/gimbals portions set of hinges. When magnetically stimulated, the mirror portion rotates about the mirror/gimbals portions set of hinges, providing the first axis of motion. The second pair of magnets are suitably attached to the gimbals portion of the mirror assembly, one on each of two opposite sides of a line, 90 degrees relative to a line drawn through the gimbals/frame portions set of hinges. When magnetically stimulated, the mirror and gimbals portions rotate about the second set of axis, to providing the second axis of rotation.

According to a feature of the invention, an additional magnet is provided at each magnet location, with the poles in opposing relationship to each other and disposed on the opposite face of mirror assembly to balance the weight of the magnets relative to the hinge centerlines of the mirror assembly, eliminating undesirable oscillations under external shock or other conditions.

According to a modified embodiment, a single magnet can be utilized located in the center of the mirror portion, on the face opposing the surface serving as the mirror.

According to another feature of the invention, motion stops, disposed in a plane described by the two axes of rotation, are added to the mirror assembly at each hinge location to limit motion and thereby prevent failure of the hinge. Tabs are preferably formed in the plane described by the two axes of rotation, extending from the mirror portion to the gimbals portion and from the gimbals portion to the frame portion, to prevent rotation during initial manufacture. Sometime prior to final assembly, laser or other suitable cutting means severs the tabs, preferably perpendicular to each respective axis of the hinges, to allow free rotation.

In order to obtain extended operation without degradation, the mirror assembly is preferably hermetically assembled into a cavity in the package to lock out moisture and allow the provision of a benign atmosphere for micromirror operation. The cavity can be filled with selected gases to provide improved heat transfer and, if desired, exclude oxygen or other gases that would adversely affect the micromirror over time. The hermetic package comprises the header in which the cavity is formed and which includes sealed pins for electrical LED connection pins. A peripheral seat surface on the header extending around the cavity is coated with indium or suitable non-organic seal materials, for later attachment of a window over the cavity. The use of indium allows the seal to be made at room temperature to avoid seal temperature induced stresses and window distortions. Indium or other non-organic attach materials are used exclusively to assembly all items within the body cavity of the hermetic package, avoiding any unwanted long term organic out gassing or other similar problems.

According to another feature, the window is tilted at a slight angle, such as 6 degrees, to deflect unwanted stray light away from the desired optical path.

The lead frame assembly described above, containing LED's and the mirror assembly, is placed in and attached to the body on a platform within the cavity. The tabs preventing rotation of the mirror and gimbals portions during assembly may now be released as described above. The body cavity is sealed with a glass window that preferably has been treated with anti-reflective coatings.

An air coil drive assembly is used and preferably employs a push and pull arrangement for driving the mirror magnets to rotate the mirror portion to the desired orientation in its two axes. Four air coil assemblies, comprising copper wire coiled on a bobbin, are attached to a mounting bracket, trapping a flex circuit harness and are aligned with the mirror assembly. The air coil leads are soldered to the flex circuit harness to allow system electrical control of the air coils and their push pull arrangement to drive the mirror assembly. The air coil bobbins are made of aluminum or other eddy current generating material, and sufficient amounts of aluminum are provided at the top and bottom of the bobbins to allow eddy current dampening of the movable portions of the mirror assembly, to prevent unwanted oscillations. In order to prevent overheating and loss of mirror position control, the air coil bobbins are made of high heat transfer material, such as aluminum, and the bobbins are massive relative to the air coils. The mounting bracket is massive relative to the bobbins and is also made of a high heat transfer material, such as aluminum. The bracket is in intimate contact with the optical unit housing, which in turn is in intimate contact with the ultimate heat sinking of the customers system.

According to yet another feature, the air coil bobbins trap the flex circuit harness to the bracket when the air coil bobbins are attached to the bracket to facilitate later location and assembly of the flex circuit to the bracket. The LED pins of the header assembly are soldered to the appropriate pads on the flex circuit harness. The micromirror can fully be tested at this point. The header assembly is then rotated and aligned with the mounting bracket and joined by fixing the header assembly to the mounting bracket. The open area around the air coils is then potted with heat conductive material to ensure optimum assembly rigidity and improved heat transfer.

Other objects and advantages of the present invention will be apparent from the following description.

BRIEF DESCRIPTION OF THE DRAWINGS

For a more complete understanding of the present invention and further advantages thereof, reference is now made to the following detailed description of the preferred embodiments taken in conjunction with the drawings in which.

DETAILED DESCRIPTION OF PREFERRED EMBODIMENTS

Figure 1:
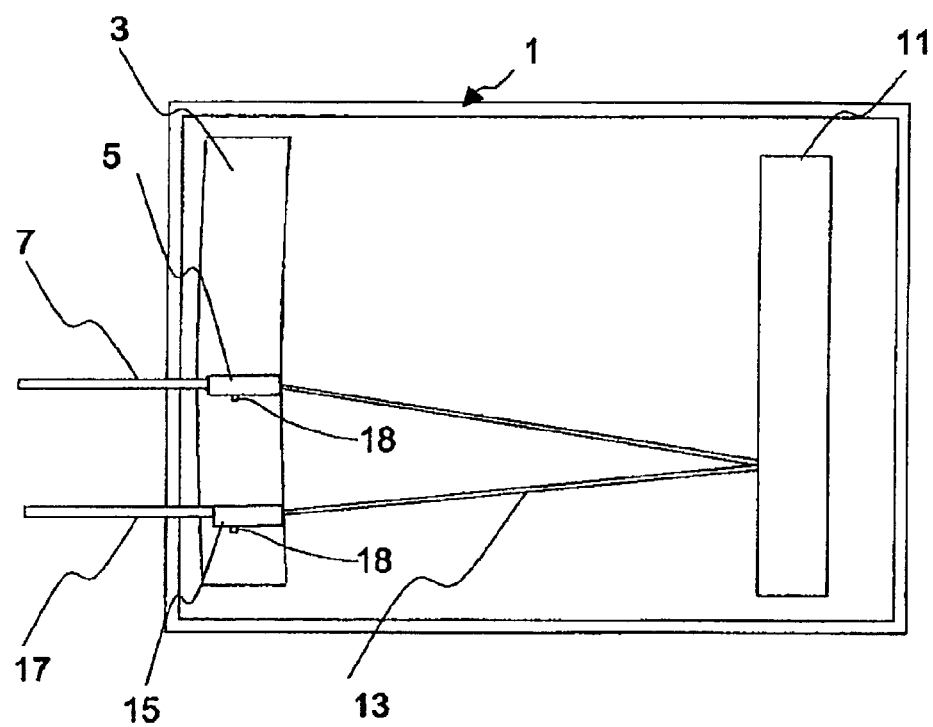
FIG. 1 is a schematic view of an optical switching station showing two optical switching units.

FIG. 1 shows the layout of a matrix optical switch station comprising a plurality of parallelly extending optical switch units 5 and 15, two being shown for purposes of illustration, but any number can be provided as desired. These switch units are mounted in a frame 3 such that they are aligned with optical switch mirror 11 fixedly mounted in housing 1.

An end portion of fiber optics cable 17 is mounted in a selected fixed position within housing 15 and fiber optics cable 7 is similarly affixed into the housing of optical switch 5. A light signal 13 is transmitted in cable 17 and is directed by optical switch unit 15, by reflecting light signal 13 from optical switch mirror 11 to another selected optical switch unit, such as optical switch 5, which directs light signal 13 into cable 7.

A light beam controlled by a single movable mirror will enter various target positions with an angle of incidence that varies with the target position of the beam. The use of two movable mirrors in the system allows a beam of light emitted on a longitudinal axis to be directed at any angle by the first movable mirror and exit the second movable mirror on a defined longitudinal axis that is invariant with changes in the incident angle of the beam. By maintaining a defined axis for the light beam, the use of two movable mirrors acts to simplify any lens used for an optical switch.

Figure 2:
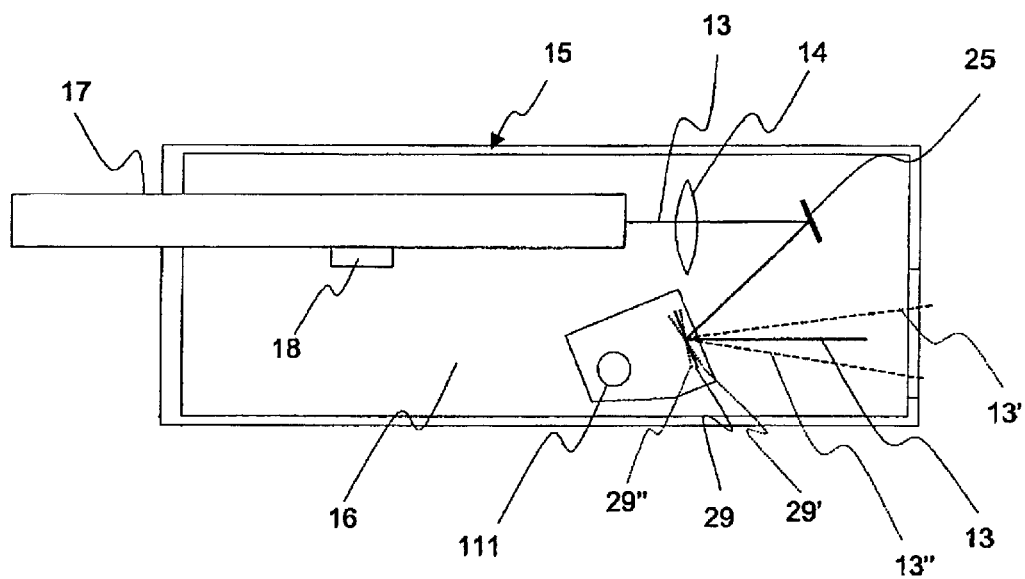
FIG. 2 is a schematic view of one of the optical switching units shown in FIG. 1.

The light signal is optimized to minimize transmission losses by the optical units. As seen in FIG. 2, light beam 13 carried by optical cable 17 is reflected by a fixed mirror 25 mounted within optical switch 15 to a moveable mirror 29, shown in a solid line in its middle or neutral unpowered position. Mirror 29 is moveable between two opposite extremes, 29', 29", with light beam 13 correspondingly reflected to 13', 13", respectively.

The first movable mirror 29 selects the target position for creating an optical path. Movable mirror 29 can select any one of a plurality of optical switch units to create an optical connection by directing the light beam 13 to the movable mirror on the second unit. Light beam 13 when it is targeted on the second movable mirror is again reflected at an angle that is based on the incident angle of the beam. By operating the second movable mirror the incident angle of the beam can be changed such that the light is reflected on the longitudinal axis of the second optical switch unit.

LED's mounted in an array adjacent a first movable mirror 29, as disclosed below, provide radiation which is detected by detector 16. Radiation from the LED's in the array associated with the first movable mirror is received in a radiation guide of another, selected fiber and individually measured by control 100 (FIG. 7a). The position of the associated movable mirror of the selected fiber is adjusted until radiation received from each LED from the first mirror is substantially equal, as described in relation to moving fiber ends in U.S. Pat. No. 5,177,348, supra.

Although the movement of the mirror shown in FIG. 2 illustrates movement in one plane, mirror movement in a second plane is also included in the operation of the switch and will be described below.

Figure 3:
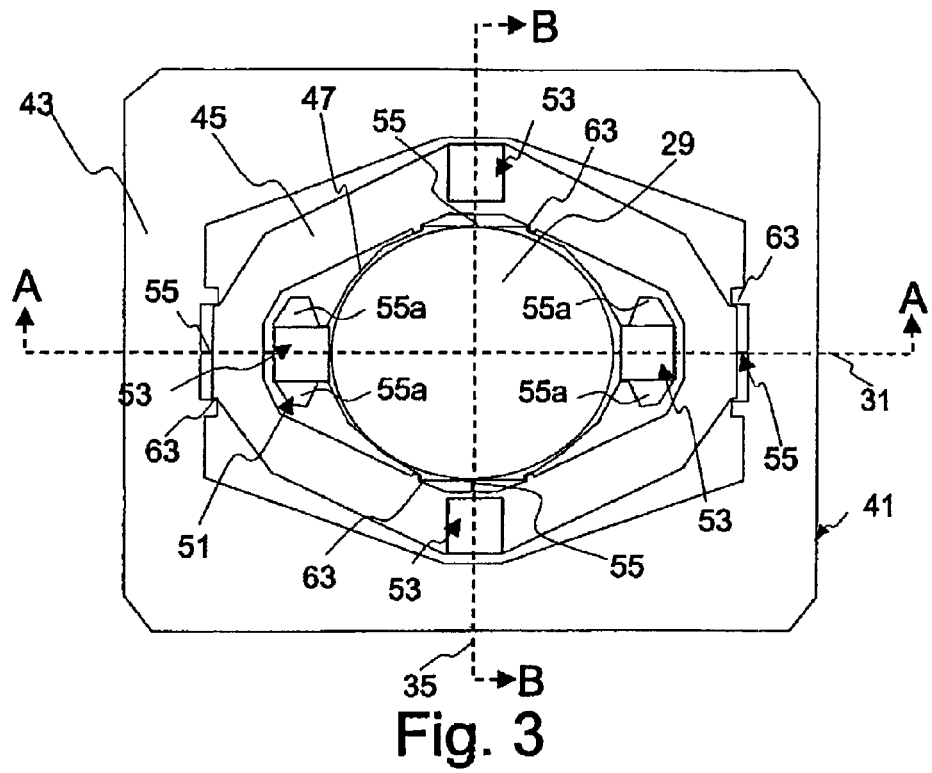
FIG. 3 is a plan view of a mirror assembly used in the FIG. 2 switch unit.

Mirror assembly 41, FIG. 3, is preferably formed from one piece of crystal material such as silicon, etched to provide an outer frame portion 43 forming an opening in which an intermediate annular gimbals portion 45 is attached at opposing hinge locations 55 along first axis 31. An inner, centrally disposed mirror portion 47, having a mirror 29 centrally located thereon, is attached to gimbals portion 45 at hinge portions 55 on a second axis 35, 90 degrees from the first axis. Mirror 29 is suitably polished on its upper surface to provide specular surface and, preferably, is similarly polished on its lower surface as well, in order to prevent stresses in the material which could otherwise cause a certain warpage due to the thinness of the sheet material, e.g., on the order of 100 microns.

A first pair of permanent magnets 53 is mounted on gimbals portion 45 along the second axis and a second pair of permanent magnets 53 is mounted on extensions 51, which extend outwardly from mirror portion 47 along the first axis. In order to symmetrically distribute mass about the two axes of rotation to thereby prevent oscillation under shock and vibration, each permanent magnet 53 preferably comprises a set of an upper magnet 53a mounted on the top surface of the mirror assembly 41 using conventional attachment techniques such as indium bonding, and an aligned lower magnet 53b similarly attached to the lower surface of the mirror assembly as shown in FIGS. 3a–3d. The magnets of each set are arranged serially such as the north/south pole arrangement indicated in FIG. 3c. There are several possible arrangements of the four sets of magnets which may be used, such as all like poles up, or two sets of like poles up, two sets of like poles down, or three sets of like poles up, one set of like pole down, depending upon magnetic characteristics desired.

By mounting gimbals portion 45 to frame portion 43 by means of hinges 55, motion of the gimbals portion 45 about the first axis 31 is provided and by mounting mirror portion 47 to gimbals portion 45 via hinges 55, motion of the mirror portion relative to the gimbals portion is obtained about the second axis 35, thereby allowing independent, selected movement of the mirror portion 47 along two different axes.

Figure 3A:
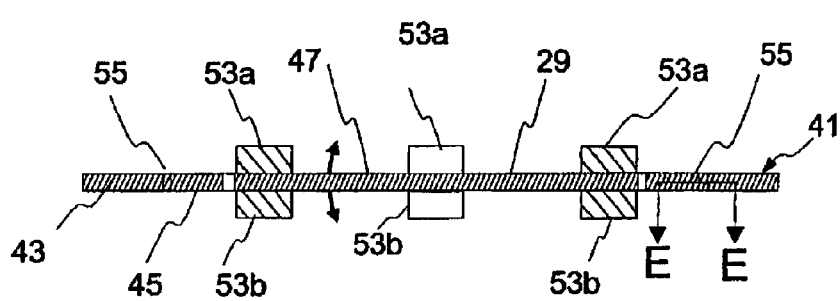
FIG. 3a is a cross sectional view taken on line A—A of FIG. 3.
Figure 3B:
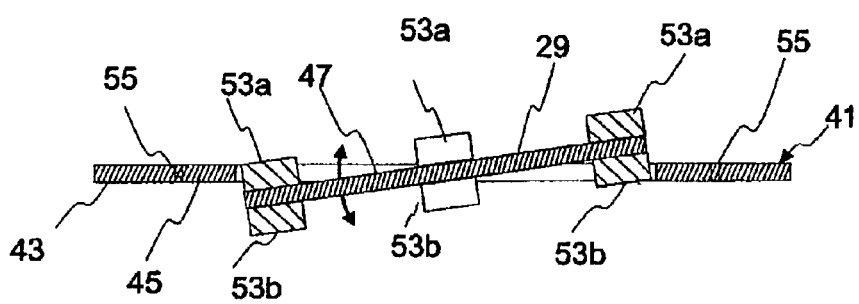
FIG. 3b is a view similar to FIG. 3a but showing rotation of the mirror portion of the mirror assembly.
Figure 3C:
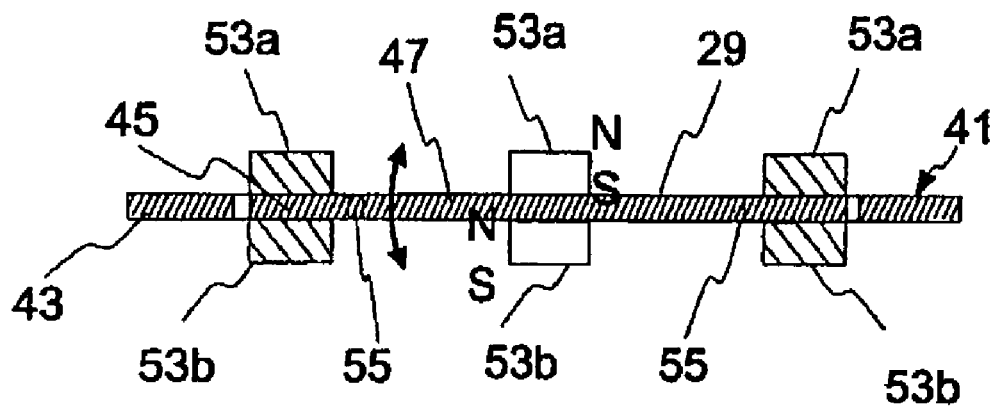
FIG. 3c is a cross sectional view taken on line B—B of FIG. 1.
Figure 3D:
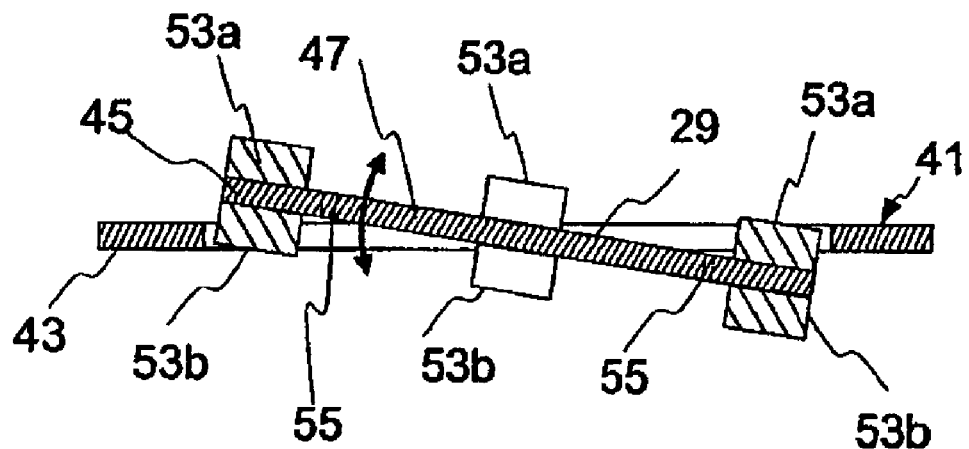
FIG. 3d is a view similar to FIG. 3c but showing rotations of the gimbals portion of the mirror assembly.

The middle or neutral position of mirror assembly 41 is shown in FIG. 3a, which is a section taken through the assembly along line A—A of FIG. 3. Rotation of mirror portion 47 about axis 35 independent of gimbals portion 45 and/or frame portion 43 is shown in FIG. 3b as indicated by the arrow. FIG. 3c shows the middle position of the mirror assembly 41, similar to that shown in FIG. 3a, but taken along line B—B of FIG. 3. Rotation off the gimbals portion 45 and mirror portion 47 about axis 31 independent of frame portion 43 is shown in FIG. 3d as indicated by the arrow. The above independent rotation of mirror 29 of mirror portion 47 about the two axes allows direction of light beam 13 as needed by the optical switch units.

Figure 4:
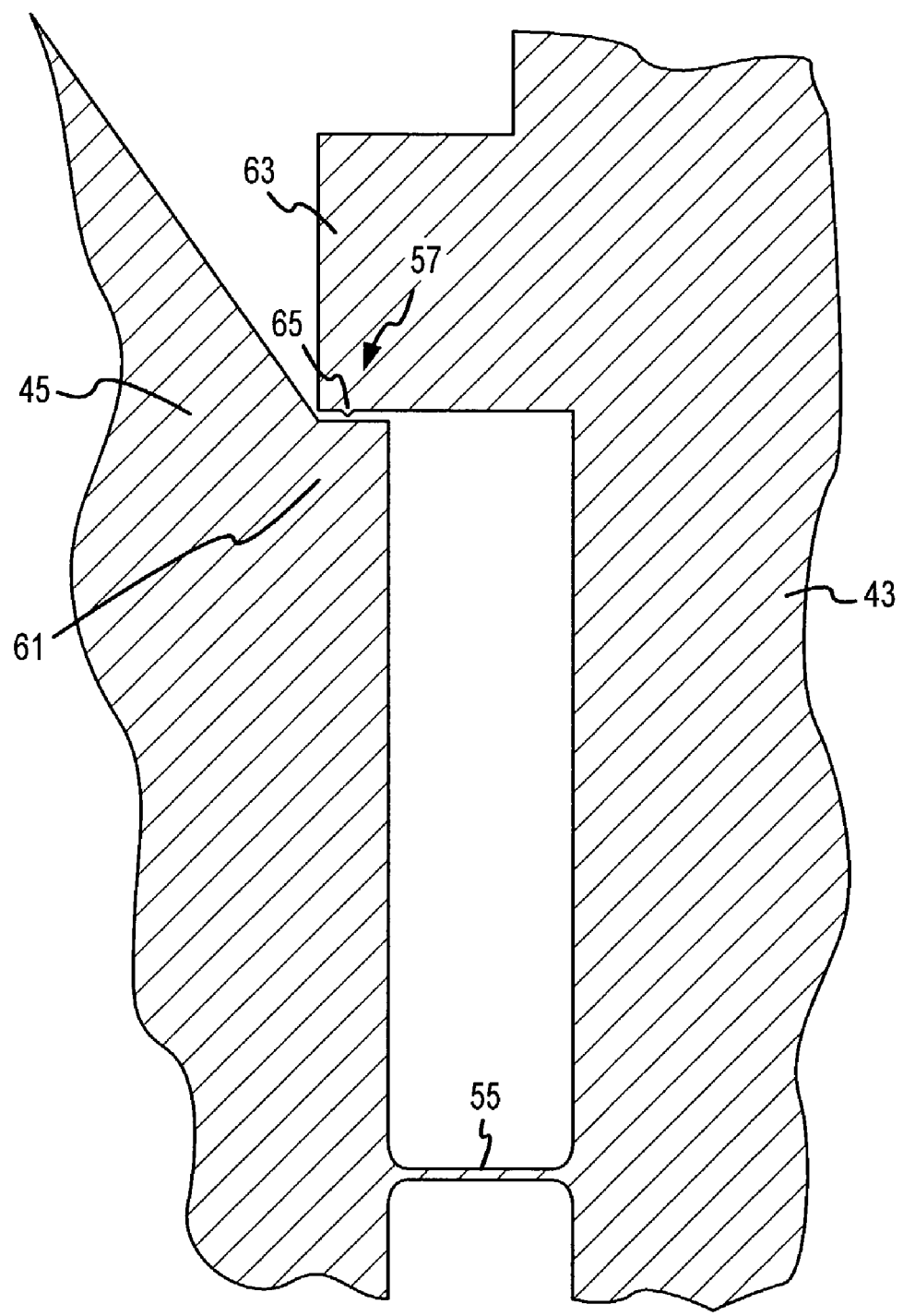
FIG. 4 is an enlarged cross sectional plan view taken on line E—E of 3a showing a hinge and an in-plane motion stop.
Figure 5:
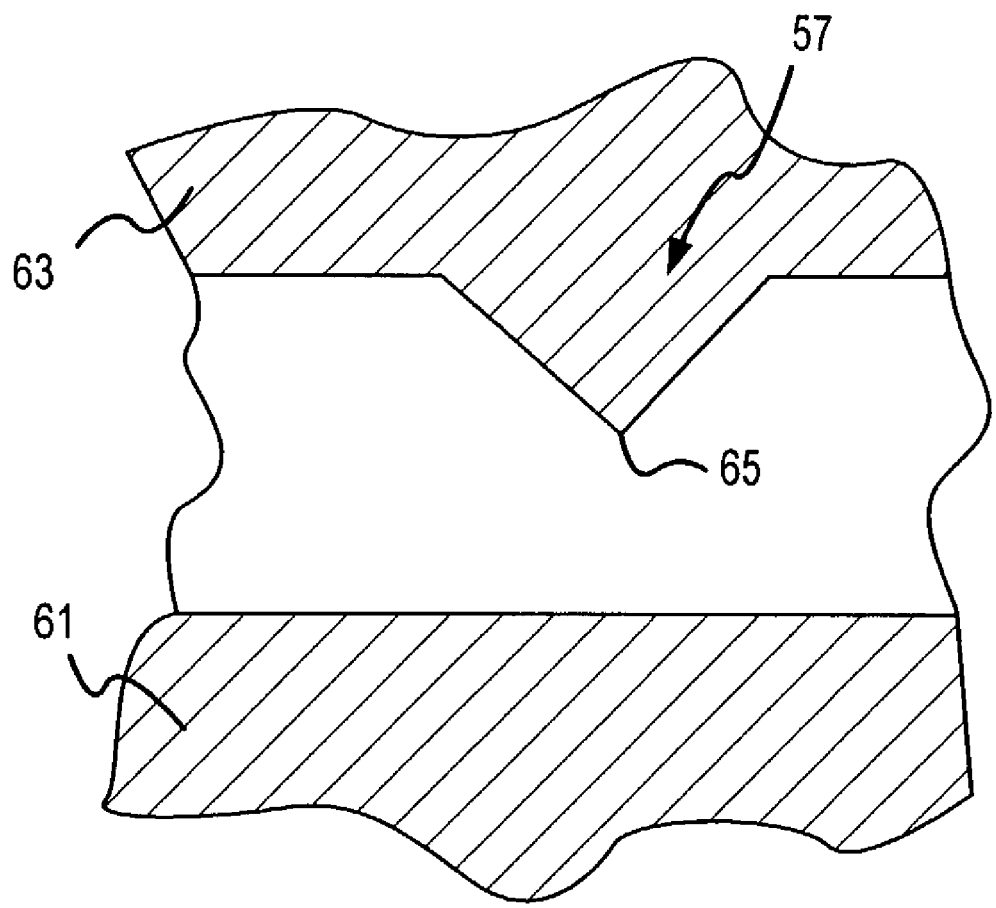
FIG. 5 is an enlarged, broken away portion of FIG. 4 showing a portion of the in-plane stop.

In order to protect hinges 55 from in-plane shock during handling and shipping, stops 57 are provided according to an optional feature of the invention as best shown in FIGS. 4 and 5, which are enlarged sectional views taken on line E—E of FIG. 3a. At this point it should be noted that the mirror assembly is on the order of 100 microns thick, whereas hinge 55 is on the order of 10 microns wide, thereby providing robust strength in directions normal to the surface of the assembly. In order to provide protection against excess in-plane motion 90 degrees to the axis of the hinge, i.e., axis 31, cooperating surfaces 61 on gimbals portion 45 and 63 on frame portion 43 are formed on either side of each hinge 55 and extend generally parallel to axis 31. Surfaces 61 and 63 are spaced apart a selected distance such as 10 microns by way of example. In order to provide less in-plane motion, projection 65, extending from surface 63 towards surface 61, is formed to any selected distance such as 5 microns. It will be understood that such projection could be provided on surface 61 instead of 63 if desired. Similar stops are provided on the mirror and gimbals portions to provide protection against in-plane motion of hinges 55 relative to axis 35.

Figure 6:
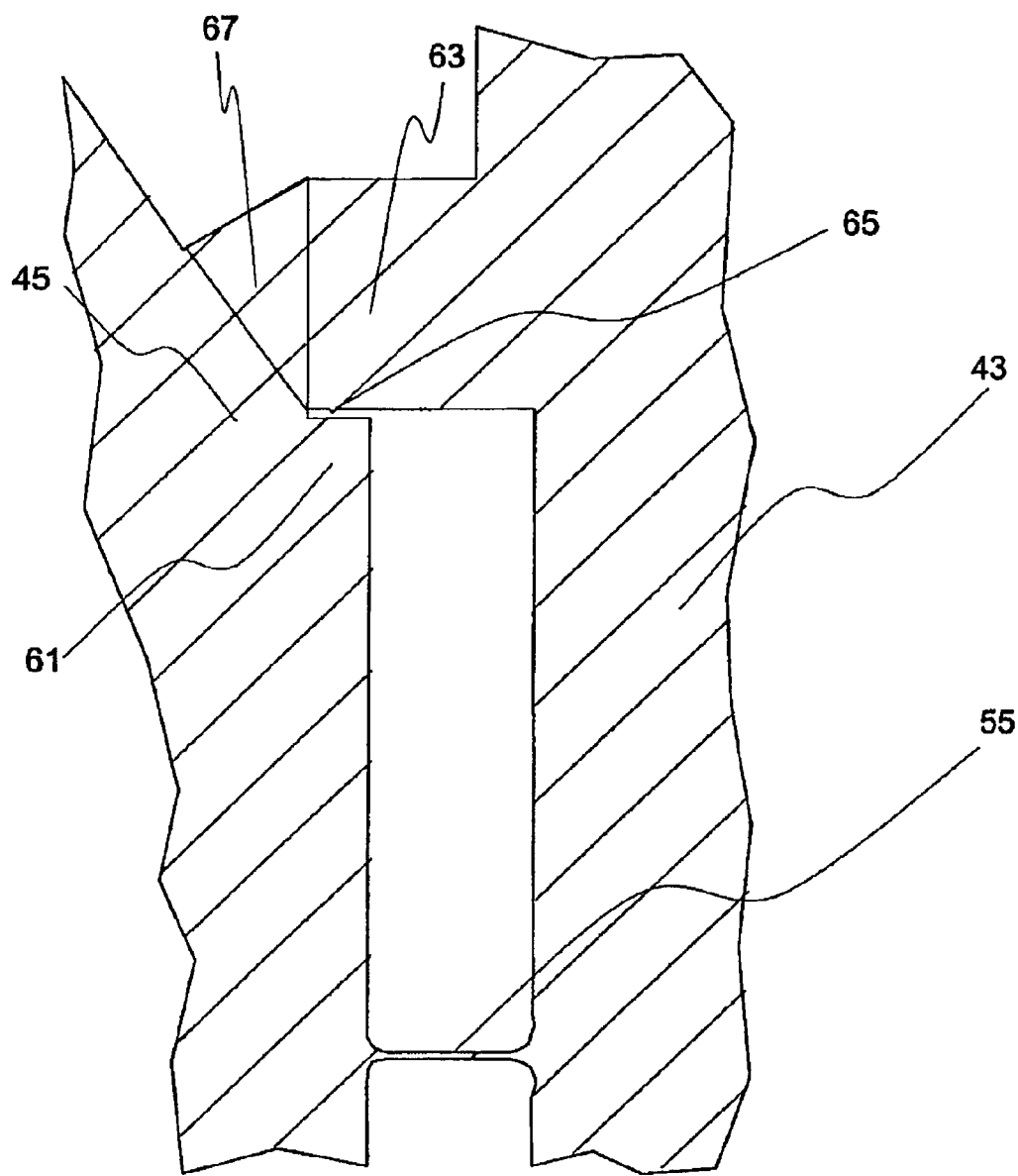
FIG. 6 is a cross sectional plan view taken on line E—E of FIG. 3a, showing a hinge with an optional lock down tab to stop rotation used during manufacture.
Figure 6A:
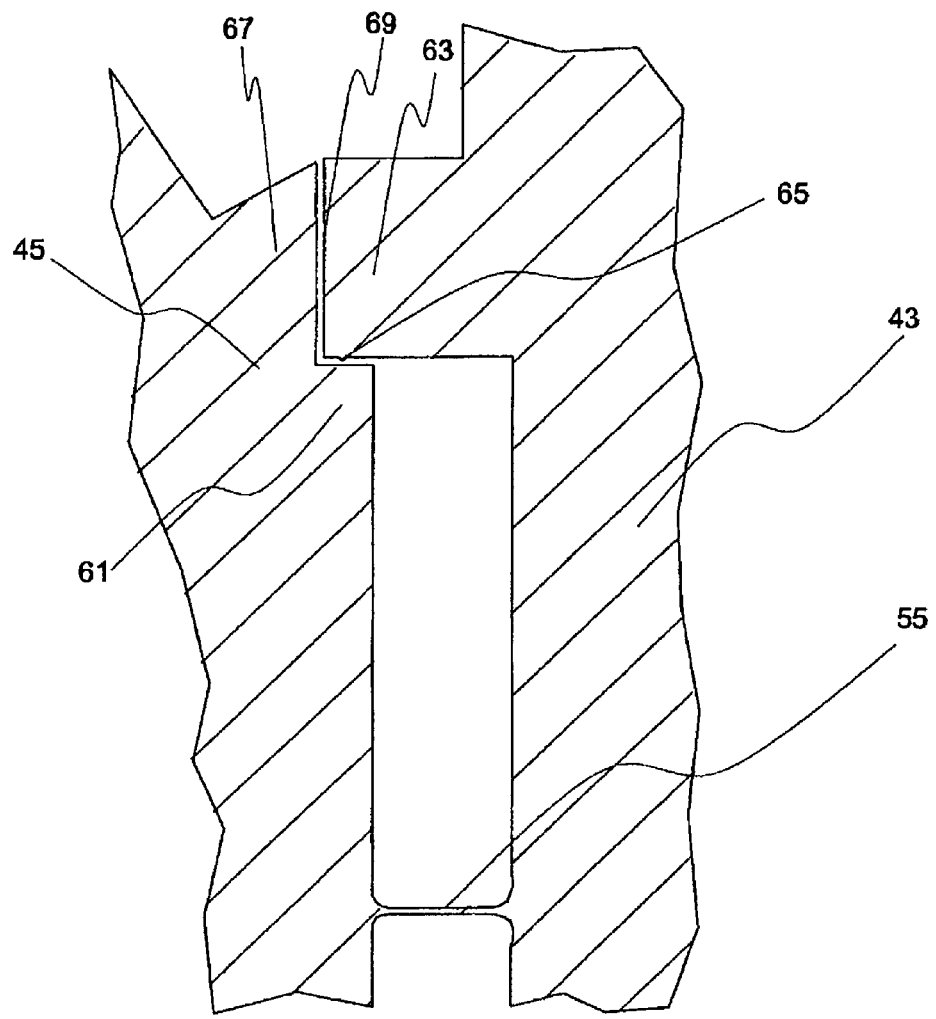
FIG. 6a is a view similar to FIG. 6 showing the lock down tab severed to allow rotation.

According to another optional feature of the invention, lock down tabs associated with each hinge are provided. As seen in FIG. 6, an example showing one such hinge 55, bridge portion 67 extends from gimbals portion 45 to frame portion 43 and locks the two portions together isolating hinge 55 from all normal manufacturing stresses. At the appropriate manufacturing step, the bridge portion 67 is cut providing gap 69 as shown in FIG. 6a, which allows normal rotation of gimbals portion 45 relative to frame portion 43 about the hinge 55. This provides suitable stress protection for all hinges and significantly improves manufacturing yields.

With reference to FIG. 3, extensions 51 are preferably provided with laterally extending tabs 51a which can be used to clamp down the mirror portion during assembly to thereby provide additional stress protection.

Figure 7:
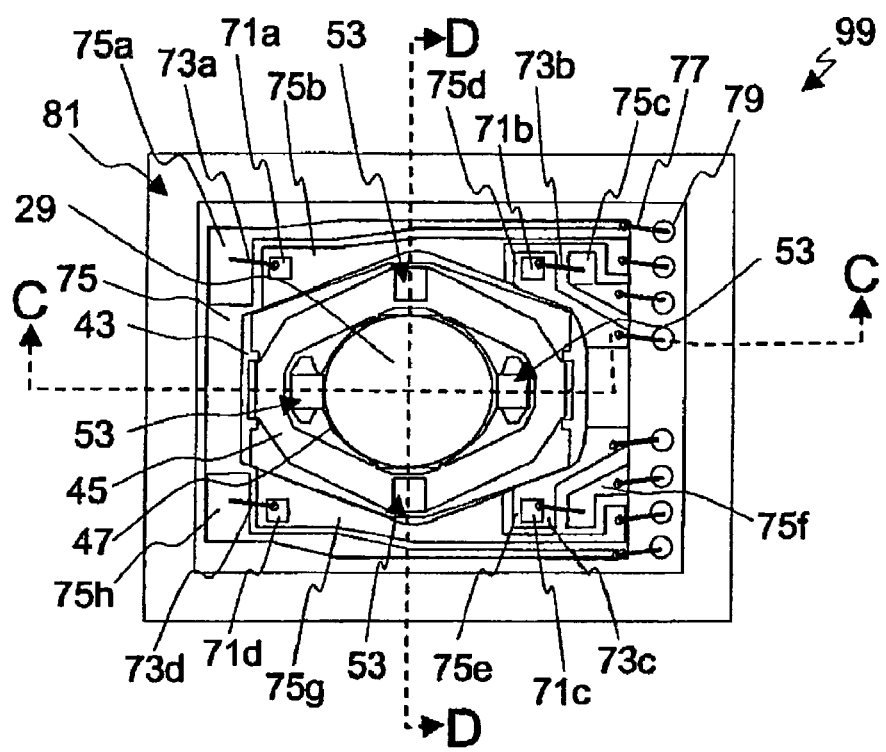
FIG. 7 is a top plan view of an optical switch package made in accordance with the invention.
Figure 7A:
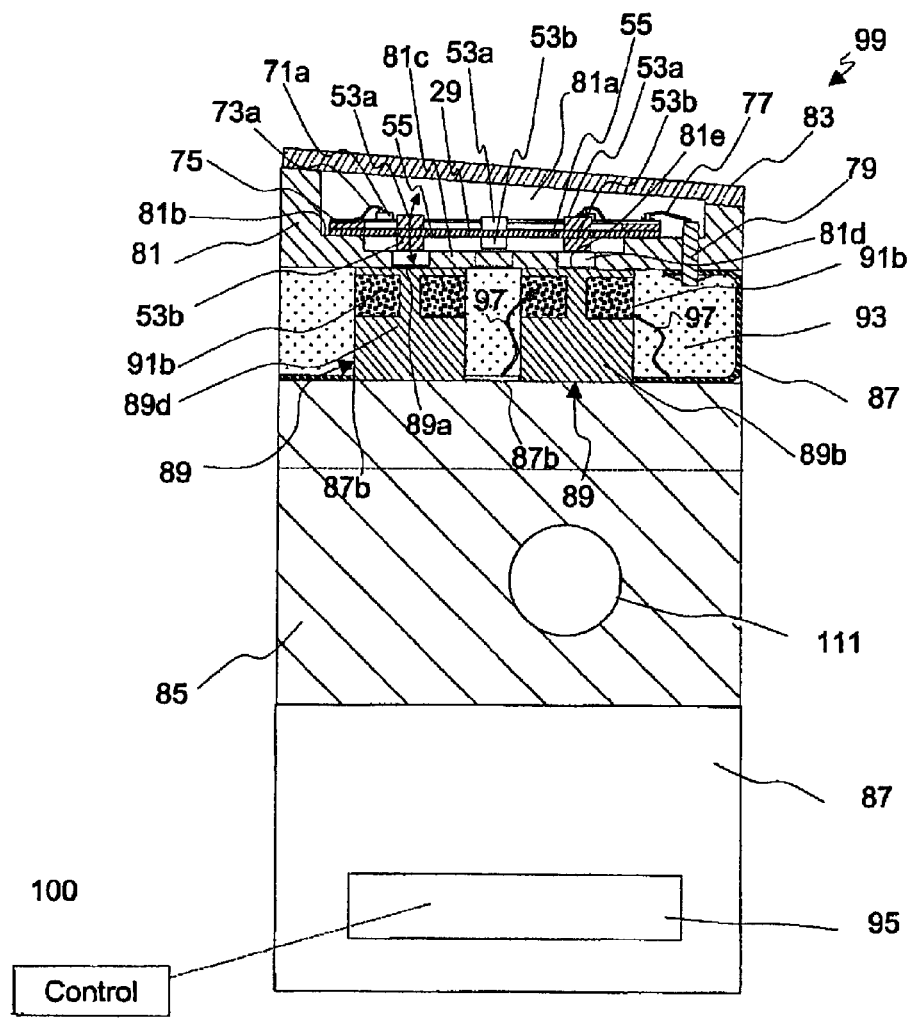
FIG. 7a is a cross sectional view taken on line C—C of FIG. 7.
Figure 7B:
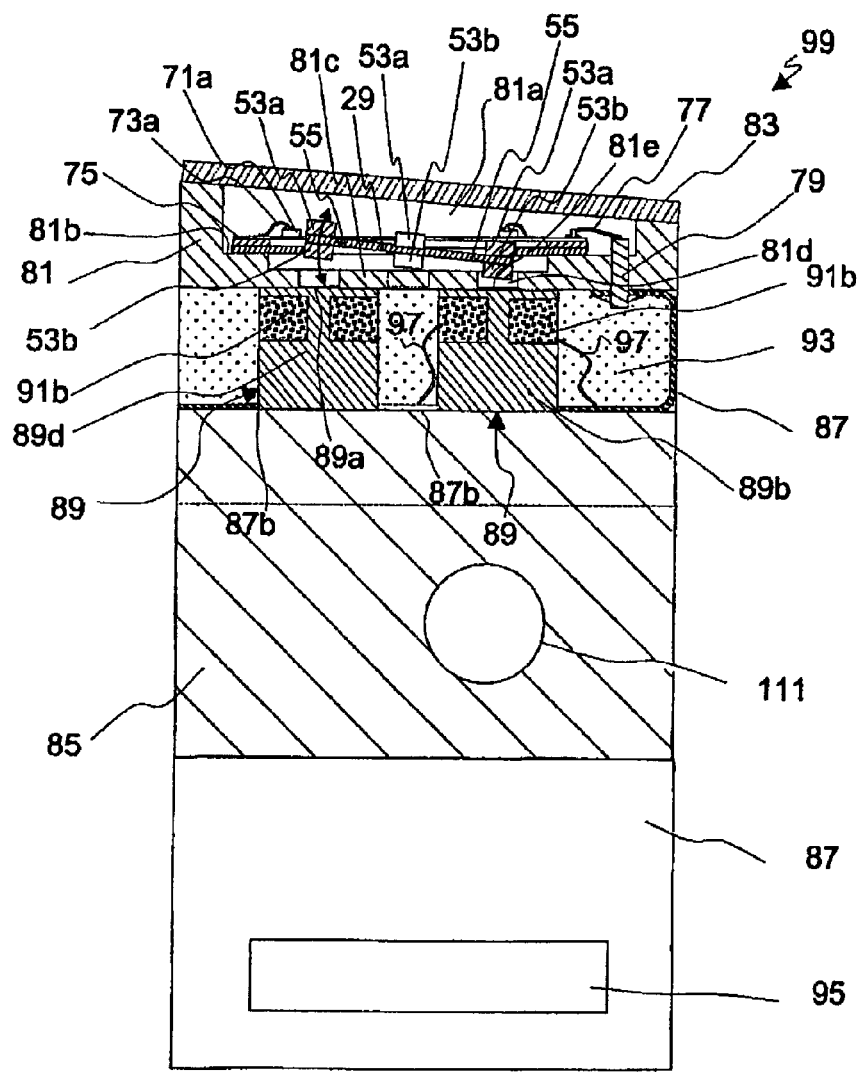
FIG. 7b is a view similar to FIG. 7 showing rotation of the mirror portion of the mirror assembly.
Figure 7C:
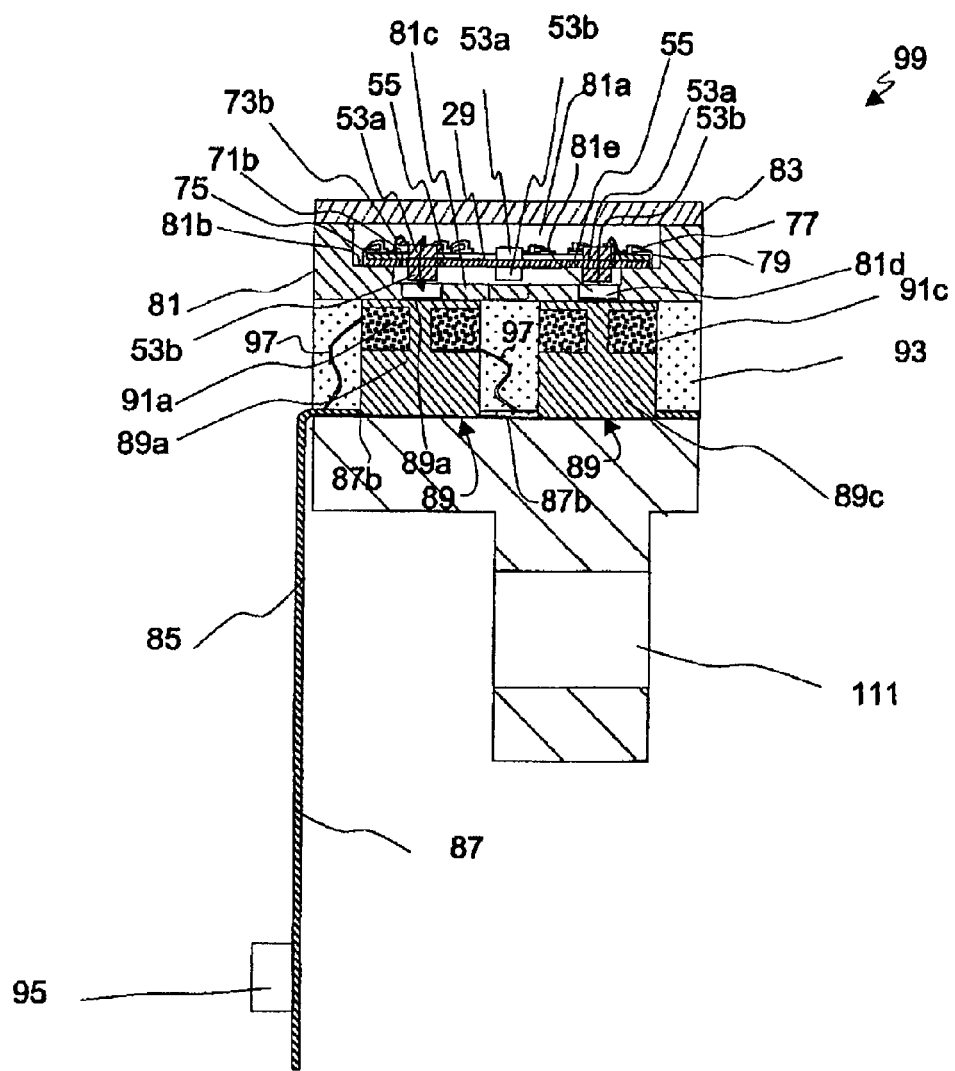
FIG. 7c is a cross sectional view taken on line D—D of FIG. 7.
Figure 7D:
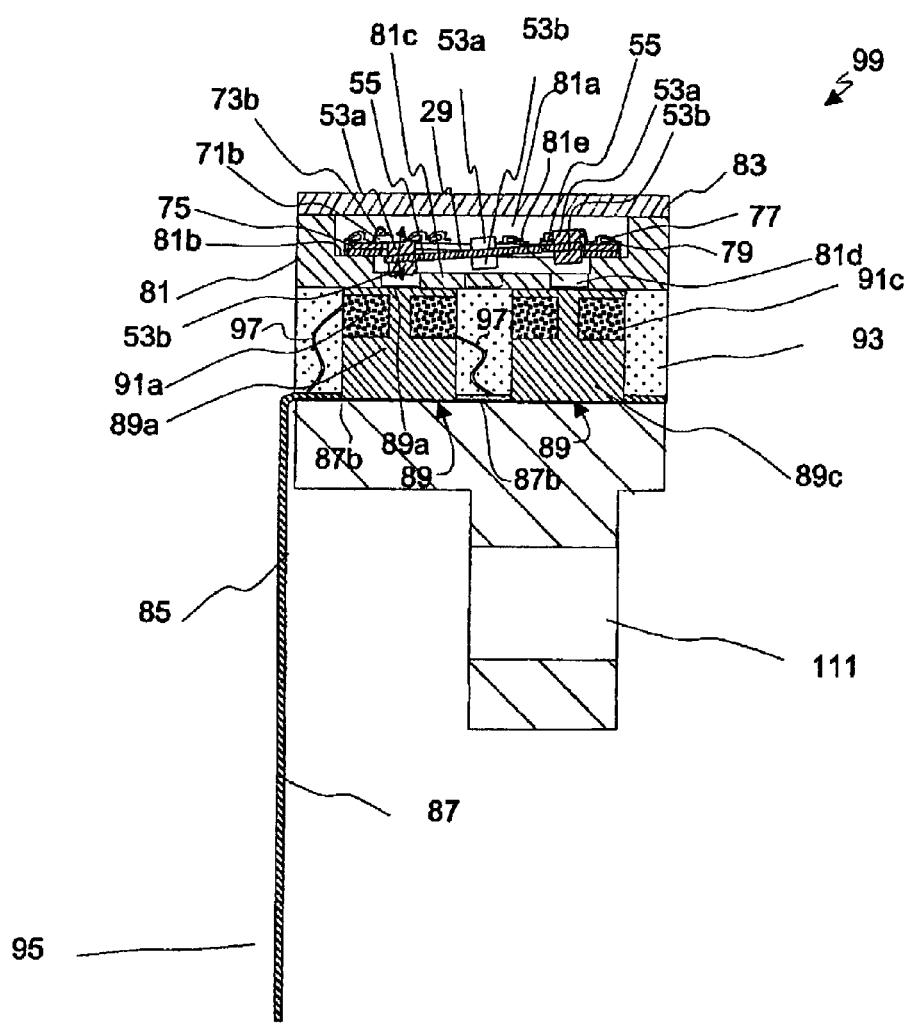
FIG. 7d is a view similar to FIG. 7c but showing rotation of the gimbals portion of the mirror assembly.

The movable mirror assembly 41 is received in a cavity 81a of a header 81 which forms part of the mirror assembly package shown in FIGS. 7–7d. Header 81 is formed of any suitable material, such as ceramic in the case of a hermetic package and plastic where hermeticity is not required, and has a circumferentially extending shelf 81b formed within cavity 81a on which frame portion 43 of mirror assembly 41 is received. Bottom wall 81c is spaced from shelf 81b to provide clearance for movement of gimbals portion 45 and mirror portion 47. Recesses 81d are formed in bottom wall 81c aligned with each set of magnets 53 to provide motion clearance for lower magnets 53b. The size of the opening of recesses 81d is maintained as small as possible, allowing suitable motion of the magnets, to facilitate making wall 81e as thin as practicable, for example 125 microns.

The magnet drive for the magnets comprise four air coils 89 (two shown in FIGS. 7c–7d) each wound on a bobbin in turn mounted on mounting bracket 85 and aligned with respective recesses 81d and magnets 53. The bobbin and bracket are made of suitable material for good heat transfer, magnetic dampening, and strength such as aluminum. The air coils are wound using high electrical conductivity materials such as copper. The bobbin has an air coil disposed proximate to top end 89a of bobbin 89 such that the air coil is as close to magnets 53 as possible, for example, 200 microns, to provide full mirror rotation using minimum power.

An electrical wiring harness 87 is provided for required electrical connections to the micromirror assembly package 99 and comprises an elongated flex circuit 87 mounting a connector 95 at one end thereof for connection to a control system (indicated at 100, FIG. 7a). An opening 87b is formed at an opposite end which receives therein bobbins 89. Coil leads 97 are attached to appropriate traces on the flex circuit as shown in 7c–7d. A plurality of diode pins 79 are mounted in bores provided in shelf 81b and extend above and below the shelf. The upper portion of the diode pins are connected by leads 77 to respective conductive pads 75a–75h (see FIG. 7) and on the lower end are connected to respective traces on electrical harness 87. LED's 71a–71d are assembled to board 75 in according to conventional semiconductor techniques and are powered by the traces on the harness discussed above. The LED's 71a–71d are positioned so that they can be used to direct the light beam 13 using the optic unit's sensing control system 100. The control system can be similar to that described in U.S. Pat. No. 5,177,348, as discussed above.

Once the electrical connections are made to the diode pins 79, window 83 is attached to the open side of header 81, closing cavity 81a. The closing of cavity 81a can be made to be a hermetic seal by using known techniques such as employing indium as the window seal material and glass sealing or the like sealing of the diode pins 79 to the header 81. If desired, a protective atmosphere such as nitrogen can be trapped within the cavity. The window is of suitable material to allow transmission of light signal 13 with minimum losses and is preferably tilted approximately 6 degrees relative to the plane in which mirror assembly lies, to deflect unwanted stray light. In this respect, the spacing between gimbals portion 45 and mirror portion 47 is maintained sufficiently large to avoid unwanted stray light.

After the electrical connections are made between diode pins 79 and harness 87 completing all electrical connections, header 81 with all of its internal components described above, are aligned with mounting bracket 85 and its components and potted in place with thermally conductive, strong potting material 93 to complete the micromirror assembly package 99.

Figure 8:
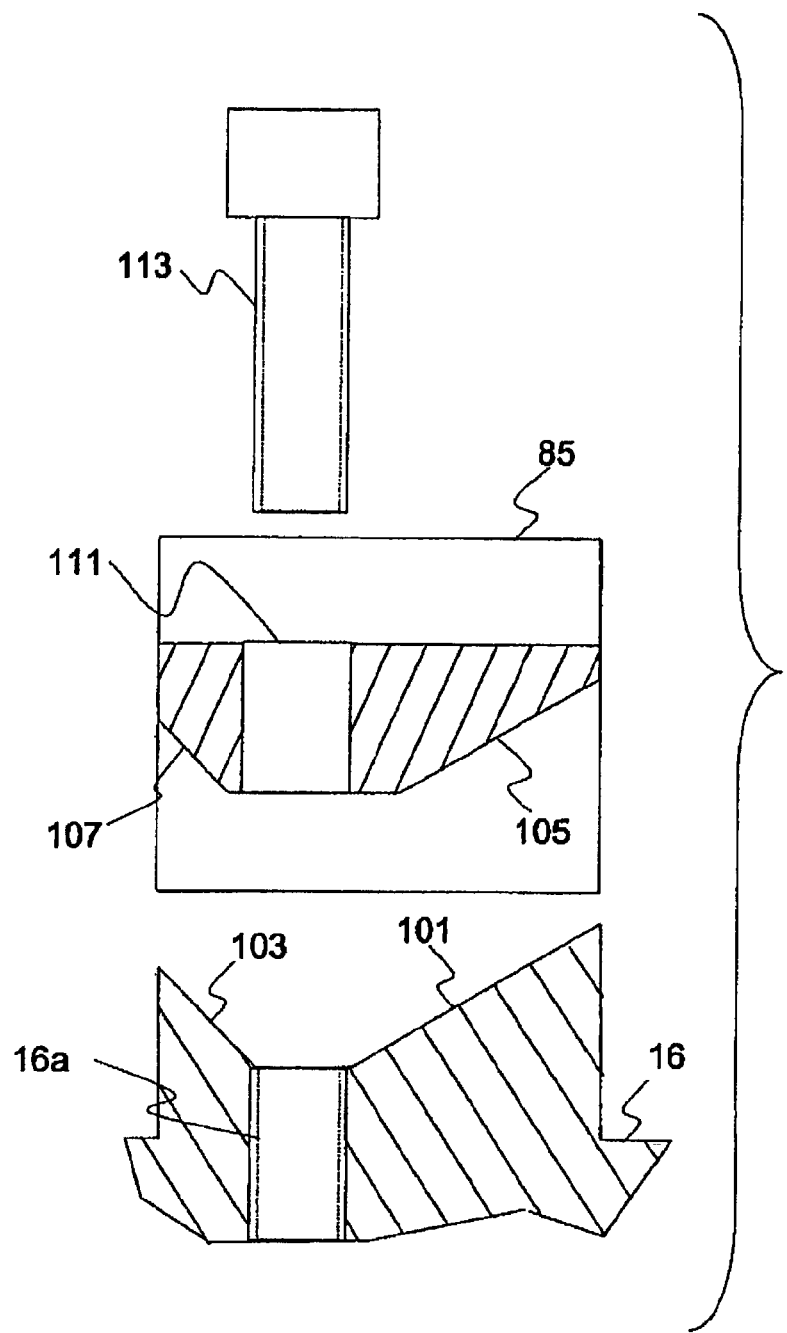
FIG. 8 is an exploded view of a cross sectional, broken away portion of the bottom wall of the housing of an optical switching unit package and the mounting bracket.

With particular reference to FIG. 8, micromirror assembly package 99 is precisely mounted and orientated in optical switch unit 15 utilizing cooperating registration surfaces of mounting bracket 85 and a portion of wall 16 of switch unit 15. First opposing tapered surfaces 107 and 105 forming a somewhat convex configuration on mounting bracket 85 cooperate with respective second opposing tapered surfaces 103 and 101, forming a somewhat concave, or cradle configuration, respectively, on bottom wall 16 of the switch unit. Mounting bolt 113 is received through bore 111 in bracket 85 and threaded bore 16a in the cradle in bottom wall 16 to secure micro mirror assembly package 99 within optical switch unit 15. The cooperating opposed surfaces provide a precise registration in two planes while bolt 113 and its corresponding bore 111 in bracket 85 and threaded bore 16a in wall 16 provides registration in a third plane.

Figure 9:
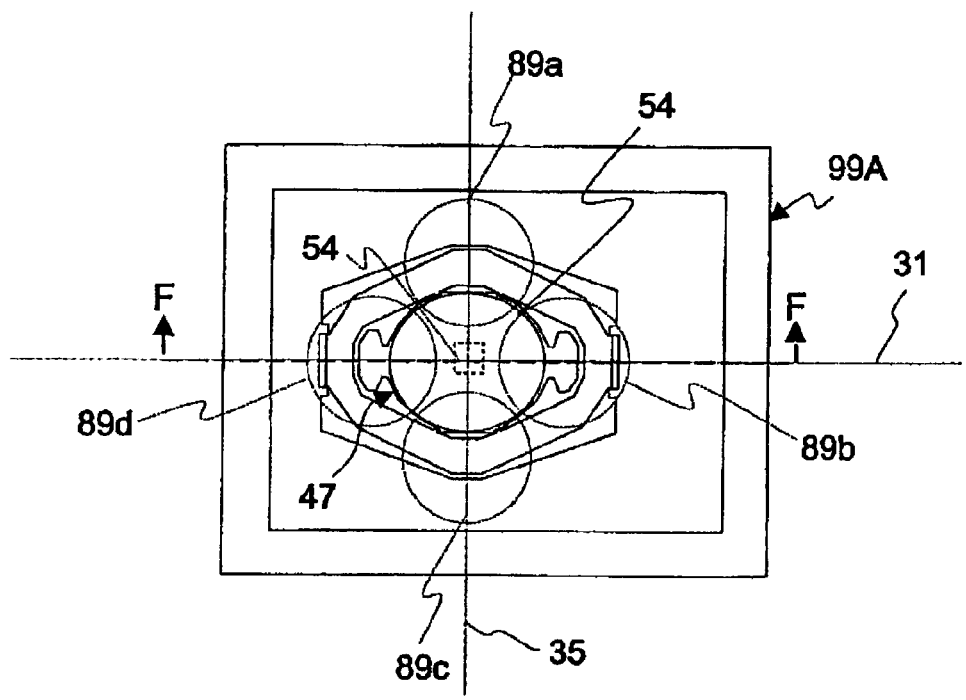
FIG. 9 is a top plan view of a modified embodiment of an optical switch unit with certain parts removed for purposes of illustration.
Figure 9A:
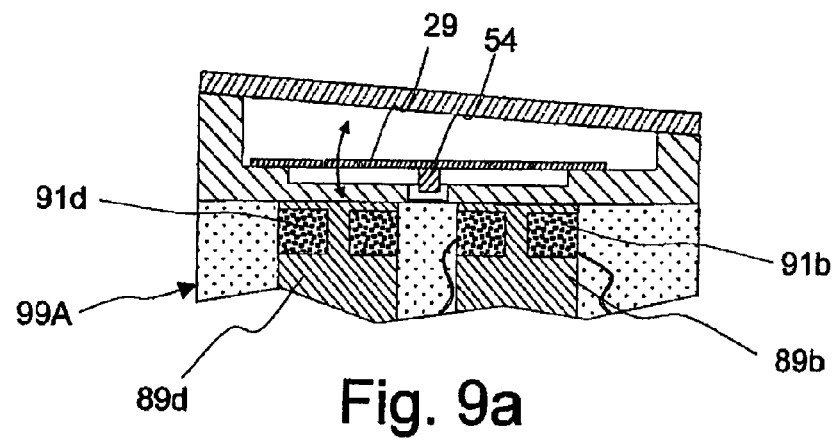
FIG. 9a is a cross sectional view of the top portion of an optical switch unit taken on line F—F of FIG. 9.
Figure 9B:
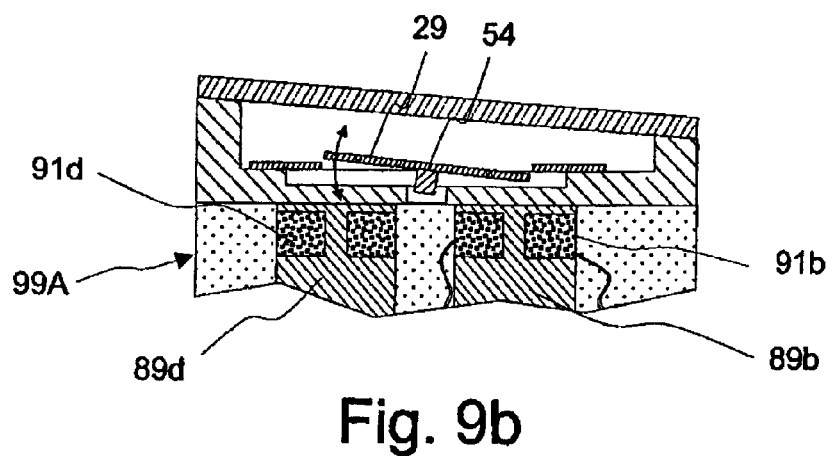
FIG. 9b is a view similar to FIG. 9a but showing rotation of the mirror portion of the modified mirror assembly.

An alternate embodiment is shown in FIG. 9 in which a single permanent magnet 54 is centrally located on the lower side of the mirror portion 47. Air coils 89a–89d are shown located in the same positions as in the FIGS. 3–7 embodiment and can be independently exited so that the interaction of the magnetic field of the permanent magnet and the coils cooperate to produce the appropriate magnetic field to cause movement of the mirror portion along each axis 31 and 35, as desired. Although four air coils are shown, if desired, three air coils could be used to produce the desired magnetic field.

Although the invention has been described with regards to specific preferred embodiments thereof, variations and modifications will become apparent to those skilled in the art. For example, magnet and air coil locations other than those described above can be employed as long as appropriate currents can be applied by means of control 100 to the air coils to move the gimbaled mirror to a desired orientation. In this respect, with reference to the four coil arrangement shown, a push-pull drive in control 100 is preferred. Further, although permanent magnets are shown attached to the movable mirror assembly, it will be appreciated that, if desired, magnetic material could be added to the assembly instead of the permanent magnets and polarized perpendicular to the mirror surface. It is therefore the intention that the appended claims be interpreted as broadly as possible in view of the prior art to include all such variations and modifications.

What is claimed is:

1. An optical beam switching system for transmitting an optical beam from at least one source to at least one of a plurality of optical receptors comprising:
  at least one source of an optical beam;
  at least one first beam directing device mounted across a first area of free space from the source;
  at least one second beam directing device mounted across a second area of free space from the first beam directing device;
  a plurality of optical receptors;
  a control operative for at least one of 1) positioning a first beam directing device to direct the optical beam from at least one source to a second beam directing device, and 2) positioning said second beam directing device to direct the optical beam from said second beam directing device to a selected one of said plurality of optical receptors; and at least one data gathering and transmission element to provide an indication regarding the current orientation of the controlled beam directing device or the current location of the optical beam to the control for adjusting at least one of the beam directing devices.

2. An optical beam switching system according to claim 1, wherein at least one data gathering and transmission element is disposed adjacent to at least one of the beam directing devices.

3. An optical beam switching system according to claim 1, wherein at least one data gathering and transmission element is disposed adjacent to at least one of the optical receptors.

4. An optical beam switching system according to claim 1, wherein the system also includes at least one optical lens for focusing the optical beam received from at least one source and transmitting such beam to a first beam directing device.

5. An optical beam switching system according to claim 1, wherein the system also includes at least one optical lens for focusing the optical beam received from a second beam directing device and transmitting such beam to an optical receptor.

6. An optical beam switching system according to any of claims 1, 4 and 5, wherein at least one of said beam directing devices is a movable mirror.

7. An optical beam switching system according to claim 6, wherein the movable mirror is movable about at least one axis of rotation.

8. An optical beam switching system according to claim 6, wherein the movable mirror is movable about at least two axes of rotation.

9. An optical beam switching system according to claim 8, wherein the two axes of rotation are disposed ninety degrees relative to one another.

10. An optical beam switching system according to any of claims 1, 4 and 5, wherein at least one first beam directing device is mounted in an optical receiving relationship with at least one source.

11. An optical beam switching system according to any of claims 1, 4 and 5, wherein at least one optical receptor is mounted in an optical receiving relationship with at least one second beam directing device.

12. An optical beam switching system according to any of claims 1, 4 and 5, wherein at least one optical receptor includes an end of an optical fiber having a longitudinal axis and the position of at least one second beam directing device is adjustable to direct an optical beam along a path coincident with the longitudinal axis of the optical fiber.

13. An optical beam switching system according to any of claims 1, 4 and 5, further comprising a stationary mirror for folding the path of the optical beam.

14. An optical beam switching system according to any of claims 4 and 5, wherein at least one focusing lens and at least one first beam directing device are mounted in a housing.

15. An optical beam switching system according to any of claims 4 and 5, wherein at least one focusing lens and at least one second beam directing device are mounted in a housing.

16. An optical beam switching system according to any of claims 1, 4 and 5, wherein there are multiple sources.

17. An optical beam switching system according to claim 16, wherein the multiple sources are mounted in a planar array.

18. An optical beam switching system according to any of claims 1, 4 and 5, wherein there are multiple first beam directing devices.

19. An optical beam switching system according to claim 18, wherein the multiple first beam directing devices are mounted in a planar array.

20. An optical beam switching system according to any of claims 1, 4 and 5, wherein there are multiple second beam directing devices.

21. An optical beam switching system according to claim 20, wherein the multiple second beam directing devices are mounted in a planar array.

22. An optical beam switching system according to any of claims 1, 4 and 5, wherein there are multiple optical receptors.

23. An optical beam switching system according to claim 22, wherein the multiple optical receptors are mounted in a planar array.

24. An optical beam switching system according to any of claims 1, 4 and 5, wherein said first area of free space is a three dimensional space.

25. An optical beam switching system according to any of claims 1, 4 and 5, wherein said second area of free space is a three dimensional space.

26. An optical beam switching system according to any of claims 1, 4 and 5, wherein at least one first beam directing device and at least one second beam directing device are separated by an area of free space, said free space being a three dimensional space.

27. An optical beam switching system for transmitting an optical beam from at least one source to at least one of a plurality of optical receptors comprising:

at least one source of an optical beam;

at least one first beam directing device mounted across a first area of free space from the source;

at least one additional beam directing device;

at least one second beam directing device mounted across a second area of free space from the first beam directing device;

a plurality of optical receptors;

a control operative for at least one of 1) positioning a first beam directing device to direct the optical beam from at least one source to at least one additional beam directing device, 2) positioning at least one additional beam directing device to direct the optical beam from said additional beam directing device to a second beam directing device, and 3) positioning a second beam directing device to direct the optical beam from said second beam directing device to a selected one of said plurality of optical receptors; and at least one data gathering and transmission element to provide an indication regarding the current orientation of the controlled beam directing device or the current location of the optical beam to the control for adjusting at least one of the beam directing devices.

28. An optical beam switching system according to claim 27, wherein at least one data gathering and transmission element is disposed adjacent to at least one of the beam directing devices.

29. An optical beam switching system according to claim 27, wherein at least one data gathering and transmission element is disposed adjacent to at least one of the optical receptors.

30. An optical beam switching system according to claim 27, wherein the system also includes at least one optical lens for focusing the optical beam received from at least one source and transmitting such beam to a first beam directing device.

31. An optical beam switching system according to claim 27, wherein the system also includes at least one optical lens for focusing the optical beam received from a second beam directing device and transmitting such beam to an optical receptor.

32. An optical beam switching system according to any of claims 27, 30 and 31, wherein at least one of said beam directing devices is a movable mirror.

33. An optical beam switching system according to claim 32, wherein the movable mirror is movable about at least one axis of rotation.

34. An optical beam switching system according to claim 32, wherein the movable mirror is movable about at least two axes of rotation.

35. An optical beam switching system according to claim 34, wherein the two axes of rotation are disposed ninety degrees relative to one another.

36. An optical beam switching system according to any of claims 27, 30 and 31, wherein at least one first beam directing device is mounted in an optical receiving relationship with at least one source.

37. An optical beam switching system according to any of claims 27, 30 and 31, wherein at least one optical receptor is mounted in an optical receiving relationship with at least one second beam directing device.

38. An optical beam switching system according to any of claims 27, 30 and 31, wherein at least one optical receptor includes an end of an optical fiber having a longitudinal axis and the position of at least one second beam directing device is adjustable to direct an optical beam along a path coincident with the longitudinal axis of the optical fiber.

39. An optical beam switching system according to any of claims 27, 30 and 31, further comprising a stationary mirror for folding the path of the optical beam.

40. An optical beam switching system according to any of claims 30 and 31, wherein at least one focusing lens and at least one first beam directing device are mounted in a housing.

41. An optical beam switching system according to any of claims 30 and 31, wherein at least one focusing lens and at least one second beam directing device are mounted in a housing.

42. An optical beam switching system according to any of claims 27, 30 and 31, wherein there are multiple sources.

43. An optical beam switching system according to claim 42, wherein the multiple sources are mounted in a planar array.

44. An optical beam switching system according to any of claims 27, 30 and 31, wherein there are multiple first beam directing devices.

45. An optical beam switching system according to claim 44, wherein the multiple first beam directing devices are mounted in a planar array.

46. An optical beam switching system according to any of claims 27, 30 and 31, wherein there are multiple second beam directing devices.

47. An optical beam switching system according to claim 46, wherein the multiple second beam directing devices are mounted in a planar array.

48. An optical beam switching system according to any of claims 27, 30 and 31, wherein there are multiple optical receptors.

49. An optical beam switching system according to claim 48, wherein the multiple optical receptors are mounted in a planar array.

50. An optical beam switching system according to any of claims 27, 29 and 31, wherein at least one first beam directing device is separated from at least one source by an area of free space, said area of free space being a three dimensional space.

51. An optical beam switching system according to any of claims 27, 29 and 31, wherein at least one optical receptor and at least one second beam directing device are separated by an area of free space, said area of free space being a three dimensional space.

52. An optical beam switching system according to any of claims 27, 29 and 31, wherein at least one first beam directing device and at least one second beam directing device are separated by an area of free space, said free space being a three dimensional space.

53. An optical beam switching system for transmitting an optical beam from at least one source to at least one of a plurality of optical receptors comprising:
  at least one source of an optical beam;
  at least one first beam directing device mounted across a first area of free space from the source;
  a plurality of optical receptors mounted across a second area of free space from the first beam directing device;
  a control so that a first beam directing device will be positioned to direct the optical beam from at least one source to a selected one of said plurality of optical receptors; and
  at least one data gathering and transmission element to provide an indication regarding the current orientation of the controlled beam directing device or the current location of the optical beam to the control for adjusting at least one of the beam directing devices.

54. An optical beam switching system according to claim 53, wherein at least one data gathering and transmission element is disposed adjacent to at least one of the beam directing devices.

55. An optical beam switching system according to claim 53, wherein at least one data gathering and transmission element is disposed adjacent to at least one of the optical receptors.

56. An optical beam switching system according to claim 53, wherein the system also includes at least one optical lens for focusing the optical beam received from at least one source and transmitting such beam to a first beam directing device.

57. An optical beam switching system according to claim 53, wherein the system also includes at least one optical lens for focusing the optical beam received from a beam directing device and transmitting such beam to an optical receptor.

58. An optical beam switching system according to any of claims 53, 56 and 57, wherein at least one of said beam directing devices is a movable mirror.

59. An optical beam switching system according to claim 58, wherein the movable mirror is movable about at least one axis of rotation.

60. An optical beam switching system according to claim 58, wherein the movable mirror is movable about at least two axes of rotation.

61. An optical beam switching system according to claim 60, wherein the two axes of rotation are disposed ninety degrees relative to one another.

62. An optical beam switching system according to any of claims 53, 56 and 57, wherein at least one first beam directing device is mounted in an optical receiving relationship with at least one source.

63. An optical beam switching system according to any of claims 53, 56 and 57, wherein at least one optical receptor is mounted in an optical receiving relationship with at least one beam directing device.

64. An optical beam switching system according to any of claims 53, 56 and 57, wherein at least one optical receptor includes an end of an optical fiber having a longitudinal axis and the position of at least one beam directing device is adjustable to direct an optical beam along a path coincident with the longitudinal axis of the optical fiber.

65. An optical beam switching system according to any of claims 53, 56 and 57, further comprising a stationary mirror for folding the path of the optical beam.

66. An optical beam switching system according to any of claims 56 and 57, wherein at least one focusing lens and at least one first beam directing device are mounted in a housing.

67. An optical beam switching system according to any of claims 53, 56 and 57, wherein there are multiple sources.

68. An optical beam switching system according to claim 67, wherein the multiple sources are mounted in a planar array.

69. An optical beam switching system according to any of claims 53, 56 and 57, wherein there are multiple first beam directing devices.

70. An optical beam switching system according to claim 69, wherein the multiple first beam directing devices are mounted in a planar array.

71. An optical beam switching system according to any of claims 53, 56 and 57, wherein there are multiple optical receptors.

72. An optical beam switching system according to claim 71, wherein the multiple optical receptors are mounted in a planar array.

73. An optical beam switching system according to any of claims 53, 56 and 57, wherein at least one first beam directing device is separated from at least one source by an area of free space, said area of free space being a three dimensional space.

74. An optical beam switching system according to any of claims 53, 56 and 57, wherein at least one optical receptor and at least one beam directing device are separated by an area of free space, said area of free space being a three dimensional space.

* * * * *

(12) INTER PARTES REVIEW CERTIFICATE (87th)
United States Patent
Laor et al.

(10) Number: US 7,095,917 K1
(45) Certificate Issued: Jul. 6, 2015

(54) OPTICAL SWITCHING APPARATUS

(75) Inventors: Herzel Laor; David A. Krozier; Leo A. Plouffe

(73) Assignee: FIBER, LLC

Trial Number:

IPR2013-00318 filed Jun. 4, 2013

Petitioner: JDS Uniphase Corporation

Patent Owner: Fiber, LLC

Inter Partes Review Certificate for:

Patent No.: 7,095,917
Issued: Aug. 22, 2006
Appl. No.: 10/197,636
Filed: Jul. 17, 2002

The results of IPR2013-00318 are reflected in this inter partes review certificate under 35 U.S.C. 318(b).

INTER PARTES REVIEW CERTIFICATE
U.S. Patent 7,095,917 K1
Trial No. IPR2013-00318
Certificate Issued Jul. 6, 2015

AS A RESULT OF THE INTER PARTES REVIEW PROCEEDING, IT HAS BEEN DETERMINED THAT:

Claims 67, 68 or 70 are found patentable.

Claims 1, 53-66, 69 and 71-74 are cancelled.

\* \* \* \* \*